Dec. 26, 1950 G. HERZOG 2,535,066
PROSPECTING
Filed March 9, 1948 2 Sheets-Sheet 1

INVENTOR.
GERHARD HERZOG
BY Daniel Stryker
ATTORNEY

Dec. 26, 1950            G. HERZOG            2,535,066
PROSPECTING
Filed March 9, 1948            2 Sheets-Sheet 2
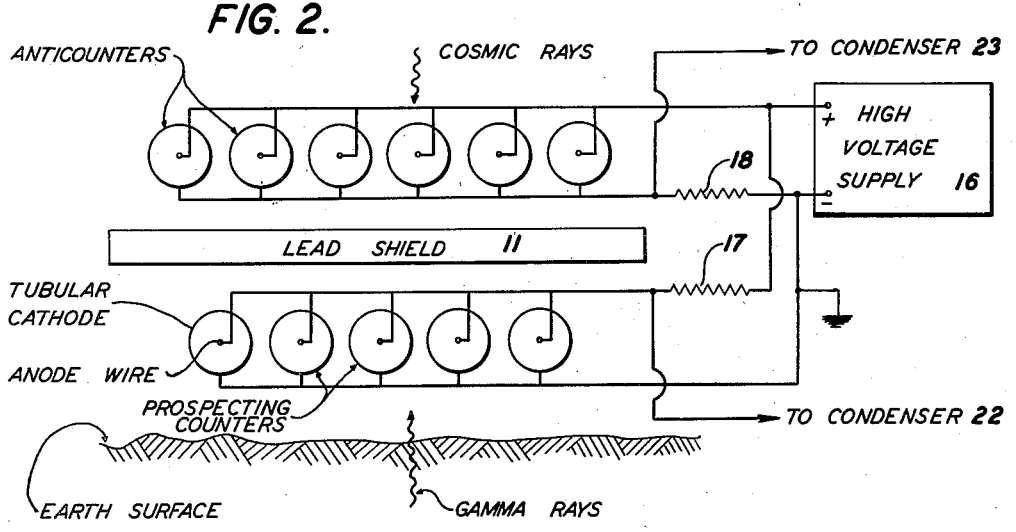
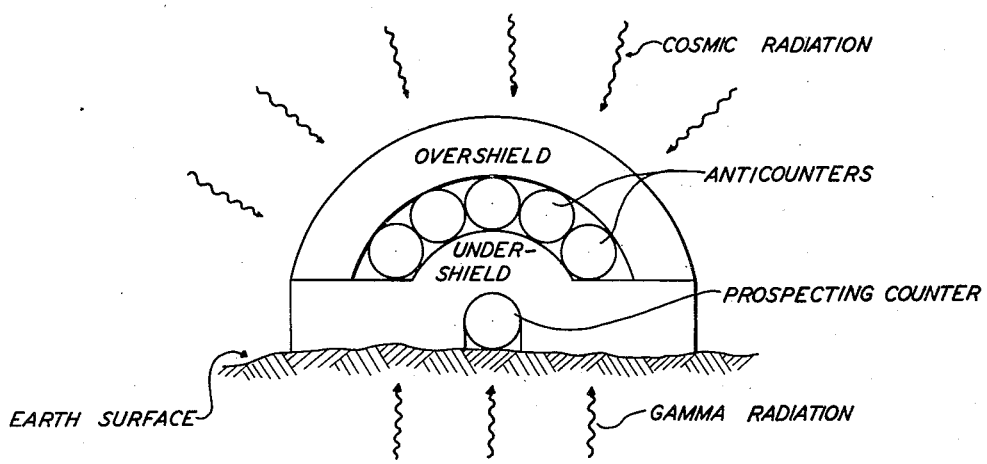
INVENTOR.
GERHARD HERZOG
BY Daniel Stryker
ATTORNEY

Patented Dec. 26, 1950

2,535,066

UNITED STATES PATENT OFFICE 2,535,066

PROSPECTING

Gerhard Herzog, Houston, Tex., assignor to The Texas Company, New York, N. Y., a corporation of Delaware Application March 9, 1948, Serial No. 13,843

19 Claims. (Cl. 250—83.6)

This invention is concerned with prospecting and particularly with the discovery of mineral deposits by measuring differences in gamma ray intensity in the neighborhood of the deposit. The invention provides methods and apparatus for increasing the accuracy of the measurements, to the end that the probability of locating mineral deposits through surveys of the radioactivity, particularly gamma radiation, of the surrounding or covering rocks, is substantially increased.

As disclosed in co-pending application Serial No. 13,842, filed March 9, 1948, it is theoretically impracticable to locate buried ore deposits, even though these be highly radioactive, by surveys of radioactivity in the neighborhood of the deposits, except in those cases in which the overburden is so thin that it does not absorb the radiations from the ore deposit to the extent that significant variations in ray intensity due to the presence of the deposit are obscured. The naturally radioactive elements, which include the uranium, thorium and actinium families and potassium, emit alpha, beta and gamma rays in various proportions and with different energies. The alpha and beta radiations have but slight penetrating power. The penetrating power of the gamma rays is higher; the absorption of these rays by any surrounding medium is governed by the exponential law. Assuming a reasonable absorption coefficient of 0.1 per cm. for the medium, say rock, a thickness of 23 centimeters will reduce the intensity of the hardest (i. e. most penetrating) gamma rays of thorium C by a factor of 10; 46 centimeters reduces the intensity by a factor of 100; 69 centimeters by a factor of 1000; 92 centimeters by a factor of 10,000; 115 centimeters by a factor of 100,000, etc. Substantially all rocks are radioactive to some extent, and even with the most sensitive of available detectors, an overburden of a few meters reduces the intensity of the gamma radiation to the point where it becomes impossible to recognize the excess activity originating in the ore body over the activity originating in the overburden. Nevertheless, as described and claimed in the aforementioned application, it is possible to recognize and locate ore bodies through cover much in excess of one meter, by means of variations from point to point in the intensity of gamma rays originating in the overburden itself. Thus, it has been discovered that ore bodies may be revealed through detection of variations of gamma radiation between points so far removed from the ore body itself as to be, for all practical purposes, beyond the range at which significant differences of intensity of gamma rays originating in the ore body are detectable. In short, a gamma ray detector, if it is sufficiently efficient and is employed for a sufficiently long time at each point where a measurement of gamma ray intensity is measured, may be used to discover significant differences in the gamma ray emission from a plurality of locations in the overburden which, indirectly, reveal the presence of the ore body.

The invention of the aforementioned application is not restricted to the discovery of ore bodies of the radioactive elements. In fact, it finds its major application in prospecting for ore bodies of non-radioactive metals such as iron, copper, lead, tin, zinc, etc. It has been discovered that the country rock in which such deposits occur generally shows significant deviations in gamma ray intensity from which the existence and location of the deposit may be determined. In other words, the deposits have faintly radioactive auras which, if properly detected, act as markers for the deposits, whether or not the deposits themselves are radioactive.

Barren country rocks, i. e. those in which there is no substantial content of commercial minerals, particularly the non-radioactive metallic minerals, are in general radioactive to some extent, and may show radioactivity equal to several micro-micrograms of radium per gram of rock. It is the relatively slight differences in this radioactivity of the overburden or country rock, particularly gamma ray intensity, at spaced points in proximity to an ore body which indicate the presence of the latter. As indicated above, the determination of these differences in reasonable observation times and with detectors of reasonable size, requires the use of detectors having a high gamma ray counting efficiency, several times the efficiency of the conventional Geiger-Mueller counter consisting of a tubular cathode around a wire anode. Such conventional counters have an efficiency of not to exceed about ½%; i. e. they detect on the average only one ray out of 200 received. At this low efficiency significant differences in gamma ray intensities may well be obscured. Gamma rays are emitted sporadically and at random and unless the observation time is long enough the count taken at any point may not be representative of the source. Moreover, even though the counting efficiency be increased or the time made long enough to counteract this tendency to error, significant differences may be obscured by variations in "background," caused for example by cosmic rays.

A detector which is sensitive to gamma rays is also sensitive to cosmic rays, and hence these contribute to the variable background. Cosmic rays originate in the universe and at present it is accepted that the original cosmic rays consist of protons. During the travel of these particles through the atmosphere they produce secondary rays, namely mesotrons, electrons, and gamma rays, and at the earth's surface a mixture of all of the foregoing constituents is found and directed generally downward. The gamma ray constituents of the cosmic radiation may be stopped to some degree by interposing a shield of lead or the like, the background due to this radiation being correspondingly reduced. The electrons and mesotrons of the cosmic radiation are very penetrating and the thickness of shielding required to keep these from affecting the gamma ray detector is prohibitive.

Cosmic radiations vary with latitude and altitude. There are also diurnal variations, i. e. as between day and night, and irregular variations, probably attributable to magnetic storms. The variations due to altitude are the greatest and may be quite large when a survey is made with an airborne gamma ray detector or when the terrain on which the survey is made is mountainous—a common condition in mining districts. All contribute to variations in the "background" of a gamma ray detector and may obscure the slight differences of gamma ray intensity upon which prospecting depends.

In co-pending application Serial No. 13,847, filed March 9, 1948, it is proposed to minimize the effect of cosmic ray background by employing two detectors, one of which (the prospecting detector) detects a higher proportion of gamma rays than the other (called the background counter) but both of which have a relatively high efficiency for the detection of background radiation. The two detectors are placed near each other so that they detect gamma radiation from the same general locality in the earth and also are subject to approximately the same background. The outputs of the two detectors are then subtracted from each other electrically, preferably after integration and amplification and the difference is measured. In this fashion the difference in average intensities determined by the detectors over a selected time period is obtained, and this difference is representative of gamma intensity. The two detectors may be made to detect different proportions of the gamma rays present by shielding one of the counters or by constructing one so that it has a lower efficiency for gamma rays than the other or both.

In accordance with the instant invention a somewhat similar result is obtained but the method and apparatus are different, for instead of subtracting averages from each other a process of anti-coincidence involving individual rays is employed. Thus the invention contemplates a process of prospecting involving the detection of intensity of gamma radiation from earth with a first detector sensitive to both gamma and cosmic radiation in the presence of cosmic rays, at least one additional detector sensitive to cosmic rays being interposed in the path of the cosmic rays passing to the first detector, and observing only those individual rays which are detected by the first detector alone. The practice of the invention involves connecting the detectors in an anti-coincidence circuit provided with an indicator which responds only to the counts which are not common to the two detectors. In this manner the cosmic ray background is substantially reduced and the accuracy of determination of gamma ray intensity from the ground is increased.

In the preferred practice of the invention the two detectors, which may be either single counters or banks of counters, are disposed adjacent each other and so oriented that a cosmic ray will pass through both. A suitable shield for gamma radiation is disposed between them. One of the detectors is disposed toward the source of gamma radiation to be measured, i. e. toward the earth. The other is disposed toward the source of cosmic radiation, i. e. outward. The shield thus serves two functions: it stops gamma rays originating in the earth from reaching the outer or "anti-coincidence" detector and it stops some gamma ray and other constituents of the cosmic radiation from affecting the inner or "prospecting" detector. Thus the response of the "anti-coincidence" detector to the gamma radiation from the earth is reduced while the response of the "prospecting" detector to the less penetrating part of the cosmic radiation is also reduced.

The shielding of the anti-coincidence detector, although preferred, is not essential to the practice of the invention. All known detectors of the counter type, i. e. those which are directly responsive to individual rays, have a high efficiency for the particles in cosmic radiation and a relatively low efficiency for gamma radiation. Consequently, the probability that a given cosmic ray will trip both counters is high, while the probability that the same gamma ray from the earth or from cosmic rays will trip both counters is low, even though the shield be omitted. In other words, the chance of gamma ray coincidence is low and the chance of cosmic ray particle coincidence is high, the net result being that most of the gamma rays detected by the prospecting counter will pass through the anti-coincidence circuit to the indicator, while the cosmic ray background will be suppressed, thus increasing contrast.

This contrast may be increased further by employing as the anti-coincidence counter one which has a lower efficiency for gamma rays than the prospecting counter has while retaining high efficiency for cosmic rays in both counters. This difference in efficiency in detection of gamma rays may be attained in several ways, viz:

1. By employing an anti-coincidence detector which has a smaller cathode area per unit active volume than the prospecting detector.

2. By making the cathode of the anti-coincidence detector of material of low atomic number, say aluminum or beryllium, and making the cathode of the other detector of material having a higher atomic number, say silver, tantalum or tungsten.

These and other aspects of the invention will be more thoroughly understood in the light of the following detailed description, taken in conjunction with the accompanying drawing in which:

Fig. 2 is a diagram showing a preferred form of detector set-up employing a plurality of prospecting and anti-counters; and Fig. 3 is a diagram illustrating still another set-up of detectors, employing a single prospecting counter and a plurality of anti-counters.

Figure 1:
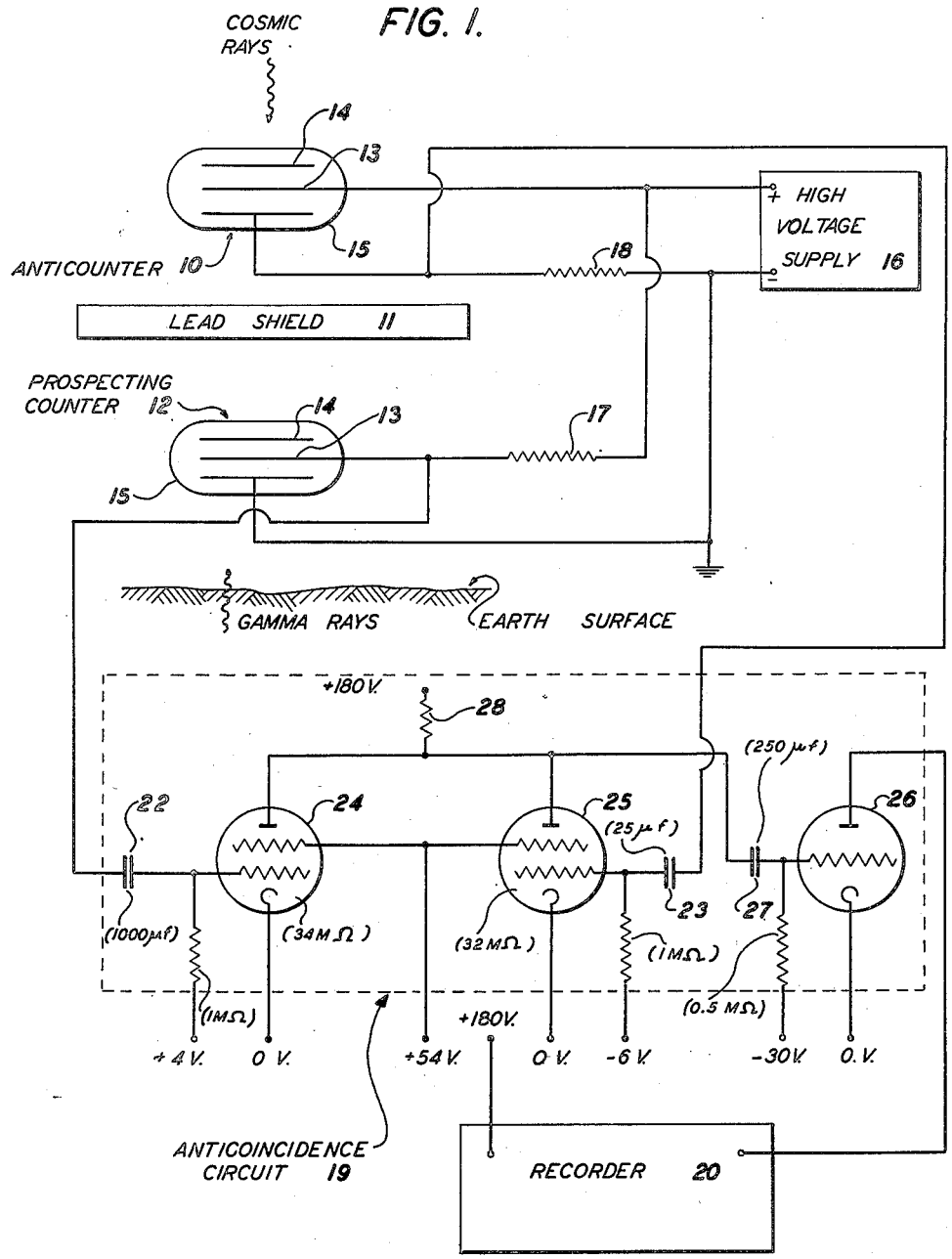
Fig. 1 is a diagrammatic illustration of a practice of the invention employing an anti-coincidence circuit.

In a prospecting survey of gamma ray intensity at a number of points on, in, or over the earth, the apparatus of Fig. 1 is so disposed that its anti-counter 10 is exposed directly to cosmic radiation but shielded from gamma radiation originating in the earth by a shield 11 of lead or the like which overlies a prospecting counter 12 that receives the gamma radiation from the earth and is not shielded. The counters employed may be of any type sensitive to gamma radiation, but in order to reduce the time required for measurement at each point the prospecting counter should have high efficiency for gamma radition. For purposes of illustration, however, the two counters of Fig. 1 are shown as self-quenching Geiger-Mueller counters having an anode 13 running through a tubular cathode 14, both elements being enclosed in an envelope 15 of glass or the like which retains a suitable atmosphere around anode and cathode.

Generally speaking, the higher the efficiency of the prospecting counter in terms of gamma ray detection the more accurate is the apparatus for determining the significant differences in gamma ray intensity of the earth, and the shorter the required observation time. Thus counters of the type described and claimed in U. S. Patent No. 2,397,071 granted March 19, 1946 are preferred. Such counters provide a plurality of cathode disks spaced from each other within an envelope with their major surfaces approximately parallel and provided with holes through which one or more anode wires are stretched and extend out of contact with the plates and transverse to their major surfaces. They have a gamma radiation counting efficiency at least 5 times as high as that of conventional Geiger-Mueller apparatus of equal active volume, and permit accurate observations of small differences in gamma ray intensity in a shorter time than the conventional Geiger-Mueller counters. However, observation time may also be decreased by employing extremely large counters of the Geiger-Mueller type or by employing a bundle of such counters connected in parallel. The crystal type of counter may also be used, and required observation time reduced by increasing size or employing a plurality of these electrically connected in parallel.

To return to Fig. 1, the prospecting counter and the anti-counter are both connected to a high voltage supply 16 of direct current. Both anodes are connected to the positive side of this voltage supply and both cathodes are connected to the negative side of the supply, but a quenching resistance 17 is inserted in the line between the voltage supply and the anode of the prospecting counter and a quenching resistance 18 is inserted in the line between the cathode of the anti-counter and the negative side of the voltage supply.

Both counters are connected to the input of a mixing circuit 19 of an anti-coincidence type, the output of the circuit being connected to a pulse indicator or recorder 20 or the equivalent. The purpose of the mixing circuits to pass only those counts from the prospecting counter which are not accompanied by simultaneous discharges in the anti-counter. Anti-coincidence circuits are not per se novel and have been disclosed by G. Herzog, in Review of Scientific Instruments vol. 11, p. 84 (1940), and by V. Sarabhai, in Physical Review, vol. 65, p. 203 (1944), and a number of such circuits are known.

The circuit disclosed in Fig. 1 has a high efficiency in suppressing undesired pulses in the practice of the invention. Its operation is based upon the connection of the counters to the mixing circuit in such fashion that the anti-counter gives impulses which are opposite in sign to those of the prospecting counter. The sum of two simultaneous pulses from the two counters is thus made such that it does not trip the output stage of the anti-coincidence circuit and send a pulse to the recorder.

In the connection of the two counters of Fig. 1 to their high voltage supply, the respective quenching resistors 17, 18 are connected in opposite sides of the supply. It will also be observed that a condenser 22 in the mixing circuit is connected on its input side between the prospecting counter and its quenching resistor 17 and that a condenser 23 in the mixing circuit is connected on its input side between the anti-counter and its quenching resistor 18. Thus, due to the position of the quenching resistors, the pulses entering the mixing circuit through the condensers are of opposite sign.

The mixing circuit includes a pair of tetrode vacuum tubes 24, 25 connected in parallel, and a trigger tube 26. The control grid of the first tetrode is connected to the prospecting counter through the condenser 22 and the control grid of the other tetrode 25 is connected to the anti-counter through the other condenser 23.

The control grid of the trigger tube is coupled through a condenser 27 to the plates of the two tetrodes, and the recorder is connected across the plate and cathode, i. e. across the output of the trigger tube.

A conventional voltage divider network (only partially indicated on Fig. 1) is employed to obtain the required potentials at various points in the mixing circuit.

In operation, the condenser 22 receives a negative pulse from the prospecting counter thus increasing the inner resistance of the slightly positive biased tetrode 24, and thus originating a positive pulse on the condenser 27. This condenser feeds the grid of the trigger tube in the usual manner and activates the pulse recorder. The bias on the other tetrode 25 is made sufficiently negative that the positive anti pulses on the condenser 23 from the anti-counter gives a negative pulse at the condenser 27 which feeds the trigger tube.

The pulses from the tube 25 arrive at the condenser with a negative polarity. The trigger tube 26 is biased beyond cutoff, so that such negative pulses cannot affect the plate current through this trigger tube and hence will not be transmitted to the recorder. Thus the anti-counter alone does not affect the recorder. In short, the only pulses which are counted are those which originate in the prospecting counter at times when no pulse originates in the anti-counter and hence are representative of radiation received by the prospecting counter from the earth, and not of cosmic rays which pass through both counters.

Typical values for voltages, resistances, and capacitances for various parts of the circuit are shown on Fig. 1.

It will be understood that a variety of types of anti-coincidence circuits may be employed in the practice of the invention, that of Fig. 1 being preferred over some others merely by reason of its simplicity.

In some cases, in order to secure adequate counting rates so that observations may be made in reasonable time, it is desirable to employ banks or bundles of counters. Such an arrangement is shown in Fig. 2 wherein a bank of anti-counters is disposed above a lead shield whereas a bank of prospecting counters is disposed below the shield toward the earth. In other words, the anti-counters are shielded from the gamma rays originating in the earth and not from the cosmic radiation, whereas the opposite is the case for the prospecting counters. The bank of prospecting counters acts as a single unit and the counters are connected in parallel with each other to a high voltage supply and to an anti-coincidence mixing circuit in the same fashion as the apparatus of Fig. 1. Similarly, the anti-counters of the other bank are connected in parallel (to act as a single unit) with the high voltage supply and to the anti-coincidence mixing circuit. If a great number of counters is used in each bank, it is sometimes advantageous to connect each counter to a separate preamplifier and to then feed the preamplified pulses into the mixing circuit.

In some cases there may be advantages to shielding the prospecting counter or counters in all directions except that from which the significant gamma radiation of the earth is received, or interposing a plurality of anti-counters above and around the prospecting counters so as to intercept cosmic radiation from the side as well as from above. Both of these situations are illustrated in Fig. 3 wherein a single prospecting counter is exposed to earth radiation but its bank of anti-counters is arranged to intercept cosmic radiation arriving at a variety of angles, the anti-counters being shielded from the earth's gamma radiation by a lead shield that is roughly U-shaped in section.

At the outset it was indicated that a portion of the cosmic radiation is so penetrating that shielding against it is impractical. However, the less penetrating portion, including the gamma ray component of the cosmic radiation may be kept from both the prospecting counters and anti-counters by means of an overshield (Fig. 3) interposed in the path of the cosmic rays to the anti-counters, and the use of such a shield for the counters is within the concept of the instant invention.

The invention finds its major field of application in the location of anomalies in the gamma ray intensity over an area in the neighborhood of an ore body. Gamma radiation from the ore body itself seldom contributes substantially to the observed anomaly, which generally is attributable to small differences in the intensity of gamma radiation originating in the substantially barren overburden or country rock. Ore bodies to be sought through the practice of the invention need not be and usually are not those of the radioactive metals. Thus the invention is applicable to prospecting for ore bodies and mineral deposits of base metals such as iron, molybdenum, tungsten, copper, zinc, lead, tin, etc., and of precious metals such as gold, silver and platinum. Anomalies may be observed in both igneous and sedimentary rocks and in connection with placer deposits as well as those occurring in solid rock.

Surveys may be made with airborne equipment at elevations of several hundred feet above the earth and major anomalies may be so located rapidly and economically. Detailed surveys may be made on the surface of the earth with the radiation detection equipment carried by man, animal or vehicle. Detailed surveys may also be made underground in any type of working, including shafts, winzes, and raises and drifts, cross cuts, adits and tunnels as well as in bore holes drilled at any angle. If the detection is sufficiently efficient in terms of gamma radiation, it is not necessary that the equipment be stationary while observations are made, and significant anomalies may be detected while flying the equipment at high speeds or while carrying it at substantial velocity along a traverse with automotive equipment.

To consider a simple case, an area to be prospected is surveyed as a rectangular grid, each intersection on the grid being an observation point. At each such point the apparatus is set up and the gamma ray intensity from the earth is measured in terms of counts or pulses per unit of time, say minutes or seconds. The anti-counter and the anti-coincidence circuit are employed to reduce background in each case. The observation period at each point is sufficiently long to obtain significant differences in gamma ray intensity. With conventional single counters of small size and efficiency, this time may be too long for practical purposes; consequently the use of high efficiency counters is recommended, in size or number sufficient that the observation time be within practicable limits. The intensities at the several points thus having been obtained, the intensities or differences in intensity are plotted and like values joined by "contour" lines. Study of the completed map may disclose anomalous "highs" or "lows" which reveal the presence of an ore body. Instead of directly observing the counts per unit time an integrating circuit can be used in combination with a recorder which gives the pulse rate.

I claim:

1. In prospecting, involving the detection of the intensity of gamma radiation from the earth with a first radiation detector in the presence of cosmic rays to which it is sensitive, the improvement which comprises interposing at least one additional detector sensitive to cosmic rays in the path of the cosmic rays passing to the first detector, and observing only those rays which are detected by the first detector alone.

2. In prospecting, involving the detection of the intensity of gamma radiation from the earth with a first radiation detector in the presence of cosmic rays to which it is sensitive, the improvement which comprises interposing at least one additional detector sensitive to cosmic rays in the path of the cosmic rays passing to the first detector, intercepting the gamma radiation from the earth to the additional detector by interposing a shield between the two detectors, and observing only those rays which are detected by the first detector alone.

3. In prospecting, involving the detection oh the intensity of gamma radiation from the earth with a first radiation detector in the presence of cosmic rays to which it is sensitive, the improvement which comprises interposing at least one additional detector sensitive to cosmic rays in the path of the cosmic rays passing to the first detector, detecting the gamma rays from the earth in the first detector with higher efficiency than in the second detector, while detecting the cosmic rays with still higher efficiency in both detectors, and observing only those rays which are detected by the first detector alone.

4. In prospecting, involving the detection of the intensity of gamma radiation from the earth with a first radiation detector in the presence of cosmic rays to which it is sensitive, the improvement which comprises interposing at least one additional detector sensitive to cosmic rays in the path of the cosmic rays passing to the first detector, and observing by anti-coincidence only those individual rays which are detected by the first detector alone.

5. In prospecting apparatus, the combination which comprises a radiation detector sensitive to both gamma and cosmic rays, a second detector sensitive to cosmic rays disposed adjacent the first detector in the path of cosmic rays passing thereto, a pulse indicator, and an anti-coincidence circuit connected to the detectors and to the indicator and so arranged that radiation simultaneously detected by both detectors is suppressed while only that detected by the first detector is registered by the indicator.

6. In prospecting apparatus, the combination which comprises a radiation detector sensitive to both gamma and cosmic rays and disposed toward the earth, a second detector sensitive to cosmic rays disposed adjacent the first detector in the path of cosmic rays passing thereto, a pulse indicator, and an anti-coincidence circuit connected to the detectors and to the indicator and so arranged that radiation simultaneously detected by both detectors is suppressed while only that detected by the first detector is registered by the indicator.

7. In prospecting apparatus, the combination which comprises a first radiation detector sensitive to both gamma and cosmic rays, a plurality of additional detectors sensitive to cosmic rays disposed adjacent the first detector in the paths of cosmic rays passing thereto, a pulse indicator, and an anti-coincidence circuit connected to the detectors and to the indicator and so arranged that radiation simultaneously detected by the first detector and one of the plurality of additional detectors is suppressed while that detected by the first detector alone is registered by the indicator.

8. In prospecting apparatus, the combination which comprises a first radiation detector sensitive to both gamma and cosmic rays, a second detector sensitive to cosmic rays and having a lower efficiency for gamma rays than the first detector disposed adjacent the first detector in the path of cosmic rays passing thereto, a pulse indicator, and an anti-coincidence circuit connected to the detectors and to the indicator and so arranged that radiation simultaneously detected by both detectors is suppressed while that detected by the first detector alone is registered by the indicator.

9. In prospecting apparatus, the combination which comprises a radiation detector sensitive to both gamma and cosmic rays, a second detector sensitive to cosmic rays disposed adjacent the first detector in the path of cosmic rays passing thereto, a shield capable of absorbing gamma radiation disposed between the detectors, a pulse indicator, and an anti-coincidence circuit connected to the detectors and to the indicator and so arranged that radiation simultaneously detected by both detectors is suppressed while that detected by the first detector alone is registered by the indicator.

10. In prospecting apparatus, the combination which comprises a gamma radiation detector, a shield for gamma rays disposed between the detector and the earth, a second detector disposed below the first and unshielded from said gamma radiations, a pulse indicator, and an anti-coincidence circuit connected to the two detectors and to the indicator and so arranged that radiation simultaneously detected by both detectors is suppressed while that detected by the second detector alone is registered by the indicator.

11. Apparatus according to claim 10 provided with a shield above the first detector for shielding it at least partially against cosmic radiation.

12. In measuring the intensity of gamma radiations from an earth surface in the presence of cosmic rays, the improvement which comprises simultaneously employing two gamma ray counters, one disposed toward the earth surface and the other adjacent but toward the origin of the cosmic rays, with a shield for gamma radiation disposed between the counters and indicating only the rays that are detected by the first counter alone.

13. In measuring the intensity of gamma radiation from an earth surface in the presence of cosmic rays, the improvement which comprises simultaneously employing two gamma ray counters, one disposed toward the earth surface and the second adjacent the first but toward the origin of the cosmic rays, shielding the second from gamma radiation originating in the earth, shielding both counters from the gamma radiation component of the cosmic rays, and indicating only the rays that are detected by the first counter alone.

14. In prospecting apparatus, the combination which comprises a first radiation detector sensitive to both gamma and cosmic rays, a second detector sensitive to cosmic rays disposed adjacent the first detector in the path of cosmic rays passing thereto, a shield capable of absorbing gamma radiation disposed between the detectors, a second shield capable of absorbing gamma ray components of the cosmic rays disposed between the second detector and the source of the cosmic rays, a pulse indicator, and an anti-coincidence circuit connected to the detectors and to the indicator and so arranged that radiation simultaneously detected by both detectors is suppressed while that detected by the first detector alone is registered by the indicator.

15. In prospecting, involving the detection of the intensity of gamma radiation from the earth in the presence of cosmic rays with detectors of the anode-cathode type sensitive to such rays, the improvement which comprises subjecting one such detector to gamma radiation from the earth, interposing another such detector sensitive to cosmic rays in the path of the cosmic rays passing to the first detector, said second detector having a smaller cathode area per unit active volume than the first detector, and observing only those rays which are detected by the first detector alone.

16. In prospecting, involving the detection of the intensity of gamma radiation from the earth in the presence of cosmic rays with detectors of the anode-cathode type sensitive to such rays, the improvement which comprises subjecting one such detector to gamma radiation from the earth, interposing another such detector sensitive to cosmic rays in the path of the cosmic rays passing to the first detector, the first detector having a cathode comprising a material of high atomic number and the second detector having a cathode comprising a material of low atomic number, and observing only those rays which are detected by the first detector alone.

17. In prospecting apparatus, the combination which comprises a first series of radiation detectors sensitive to both gamma and cosmic rays, a second series of detectors sensitive to cosmic rays, a second series of detectors sensitive to cosmic rays and adjacent the first series of detectors in the paths of cosmic rays passing thereto, a pulse indicator, and an anti-coincidence circuit connected to the detectors of each series and the indicator and so arranged that radiation simultaneously detected by a detector of the first series and a detector of the second series is suppressed while radiation detected only by detectors of the first series is registered by the indicator.

18. In prospecting apparatus, the combination which comprises a first series of radiation detectors sensitive to both gamma and cosmic rays, a second series of detectors sensitive to cosmic rays adjacent the first series of detectors and aligned with respect thereto so that a cosmic ray passing through one of the first series of detectors must pass through one of the second series of detectors, recording means, and an anti-coincidence circuit connected to the detectors of each series and said recording means and so arranged that radiation simultaneously detected by a detector of the first series and a detector of the second series is suppressed while radiation detected only by detectors of the first series is registered by said recording means.

19. The apparatus according to claim 18 wherein a gamma ray shield is provided between the two series of detectors.

GERHARD HERZOG.

REFERENCES CITED

The following references are of record in the file of this patent:

UNITED STATES PATENTS

| Number | Name | Date |
|---|---|---|
| 2,316,361 | Piety | Apr. 13, 1943 |
| 2,397,071 | Hare | Mar. 19, 1946 |

OTHER REFERENCES

Herzog, Review of Scientific Instruments, vol. 11, pp. 84 and 85.

Korff, Electron and Nuclear Counters, D. Van Nostrand, Apr. 1946, pp. 166–168 and 170.